(12) United States Patent
Amano (10) Patent No.: US 6,757,047 B2
(45) Date of Patent: Jun. 29, 2004

(54) LIQUID CRYSTAL DISPLAY DEVICE AND TESTING METHOD THEREFOR

(75) Inventor: Tomohiro Amano, Taki-Gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 386 days.

(21) Appl. No.: 09/845,637

(22) Filed: Apr. 30, 2001

(65) Prior Publication Data

US 2002/0126230 A1 Sep. 12, 2002

(30) Foreign Application Priority Data

May 8, 2000 (JP) ........................................ 2000-134172

(51) Int. Cl.$^7$ ............................................. G02F 1/1333
(52) U.S. Cl. ........................... 349/349; 40/349; 40/192
(58) Field of Search .................................. 349/40, 192

(56) References Cited

U.S. PATENT DOCUMENTS 5,608,558 A * 3/1997 Katsumi ..................... 349/192
5,936,687 A * 8/1999 Lee ............................. 349/40
6,088,073 A * 7/2000 Hioki et al. .................. 349/40
6,246,074 B1 * 6/2001 Kim et al. .................... 257/48

FOREIGN PATENT DOCUMENTS

JP          07-005481          1/1995

* cited by examiner

Primary Examiner—Tarifur R. Chowdhury
Assistant Examiner—P. R. Akkapeddi
(74) Attorney, Agent, or Firm—David G. Conlin; David A. Tucker; Edwards & Angell, LLP (57) ABSTRACT

A liquid crystal display device has data signal lines consisting of recurrently formed first, second, and third lines that have open ends and are used for data entry, first diodes formed on the first lines, and second diodes formed on the second lines and having an opposite polarity to the first diodes. In this liquid crystal display device, a test for uneven display of colors is conducted by putting a short-circuiting bar for supplying testing voltages to the data signal lines in contact with the data signal lines.

4 Claims, 6 Drawing Sheets

LIQUID CRYSTAL DISPLAY DEVICE AND TESTING METHOD THEREFOR

BACKGROUND OF THE INVENTION

1. Field of the Invention

The present invention relates to a liquid crystal display device and a method for testing a liquid crystal display device.

2. Description of the Prior Art

In recent years, liquid crystal display devices, which are lightweight, space-saving, and power-saving, have been in greatly increasing demand for their compactness and portability, and have been employed in large quantities in desk-top monitors, as displays in portable electronic devices, and in many other applications.

Figure 7:
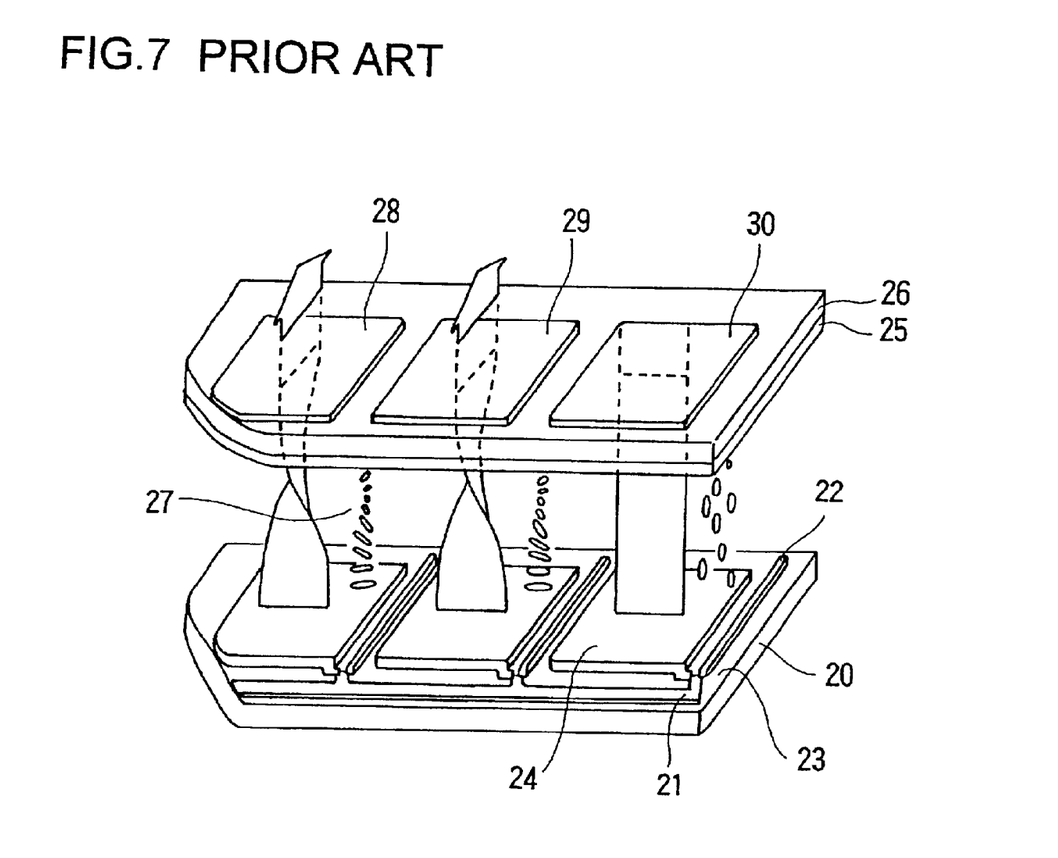
FIG. 7 is a perspective view showing the typical structure of a liquid crystal display device.

FIG. 7 is a perspective view showing the structure of a liquid crystal display device of an active-matrix type. In the following description, among many types of liquid crystal display device, an active-matrix type using thin-film transistors (hereinafter abbreviated to TFTs) or the like will be taken up as an example.

On a glass substrate 20, scanning signal lines 21 and data signal lines 22 are formed so as to cross each other and, at their crossings, TFTs 23 and pixel electrodes 24 are formed. Each TFT 23 has its gate connected to one of the scanning signal lines 21, has its source connected to one of the data signal lines 22, and has its drain connected to one of the pixel electrodes 24. Usually, a plurality of sets of these elements are arranged in an array that extends two-dimensionally. Above the glass substrate 20 on which these elements are formed, a glass substrate 26 having a transparent electrode 25 is provided so as to face the glass substrate 20, and liquid crystal 27 is sealed in between the two substrates 20 and 26. In the figure, the TFTs 23 are illustrated in a simplified manner.

Color display is achieved by providing color filters 28, 29, and 30 of three different colors, i.e. red, green, and blue (hereinafter abbreviated to R, G, and B colors, respectively), on those portions of the transparent electrode 25 that face the pixel electrodes 24 in such a way that the three colors recur every three lines. Usually, three spots that respectively give off R, G, and B colors together form one pixel. On the outer surfaces of the glass substrates 20 and 26 are provided, though not shown, polarizing plates in the form of films.

In the liquid crystal display device shown in FIG. 7, when a voltage is applied between the pixel electrodes 24, which are provided on the glass substrate 20, and the transparent electrodes 25, which are provided on the glass substrate 26, the liquid crystal molecules stand upright, which hinders light from being transmitted and thus turns the screen black. When no voltage is applied, the screen is white, and therefore this type of liquid crystal display device is called a "normally white" type. In FIG. 7, whereas the liquid crystal molecules are in twisted orientations for the R and G colors, permitting light to be transmitted through the corresponding color filters 28 and 29, no light is transmitted for the B color. Here, the voltage is applied only between the electrodes for the B color. This can be controlled by varying the voltage that is fed from the data signal lines (22 for the B color) through the TFTs to the pixel electrodes for the individual colors.

In a liquid crystal display device as described above, if variations occur in the thickness and characteristics of the color filters when they are formed or laid in position, such variations cause uneven display of colors. To inspect for such uneven display of colors, for example to inspect for uneven display of the R color, a test is conducted with the liquid crystal display device fed with a test signal that makes it transmit light only through the electrodes for the R light. Specifically, test probes are put in contact with the terminals of the data signal lines, and a driving voltage is applied to the electrodes for the G and B colors so that the R color is displayed. Similarly, in a liquid crystal display device, tests for short circuits between the pixel electrodes, short circuits between the data signal lines, and other defects are performed with probes put in contact with the data signal lines.

However, as higher and higher resolution is sought in liquid crystal display devices, they come to have increasing numbers of pixels and increasingly small pixel pitches. This requires that their testing equipment be provided with increasing numbers of probes arranged at increasingly short intervals, which complicates the design of the testing equipment and makes it expensive. Moreover, inconveniently, very short intervals between the probes tend to cause unwanted contact between the probes themselves.

To avoid this, Japanese Patent Application Laid-Open No. H7-5481 proposes a method for testing the display of colors. According to this method, along three lines substantially perpendicular to the data signal lines, the data signal lines are coated with an insulating film with every third data signal line, of which the position is shifted from one perpendicular line to the next, left exposed. Then, simply by putting three conductive short-circuiting bars in contact with the data signal lines along the three lines perpendicular thereto, it is possible to feed different electric signals to the data signal lines for different, i.e. R, G, and B, colors through the exposed portions thereof, and thereby test the display of colors.

However, this method requires the formation of the insulating film that permits selective contact between the three short-circuiting bars and the data signal lines, and thus requires an extra area outside the display area. That is, inconveniently, the liquid crystal display device as a whole needs to be made larger just to secure an area that is used only in testing and is thus of no use in actual use.

SUMMARY OF THE INVENTION

An object of the present invention is to provide a liquid crystal display device that permits easy testing for uneven display of colors, short circuits, and other defects, and to provide a method for testing a liquid crystal display device for such defects.

To achieve the above object, according to one aspect of the present invention, a liquid crystal display device is provided with data signal lines consisting of recurrently formed first, second, and third lines that have open ends and are used for data entry, first diodes formed on the first lines, and second diodes formed on the second lines and having the opposite polarity to the first diodes. Here, the data signal lines are so formed as to permit a short-circuiting bar for supplying testing voltages to be put in contact with the data signal lines at the portions thereof nearer to the ends thereof than the first and second diodes.

With this structure, simply by applying a single DC (direct-current) voltage by way of a short-circuiting bar, which promises easy and secure contact, it is possible to display the desired color according to the presence/absence and the polarity of the diodes. In this way, it is possible to realize easily a liquid crystal display device that permits easy testing for uneven display of colors. Thus, when the liquid crystal display device is tested, there is no need to put probes in contact with all the data signal terminals to apply testing voltages thereto, and thus there is no risk of the test being conducted erroneously as a result of wrong contact between the fine probes and the data signal terminals, short-circuits between the probes themselves, which are arranged at very small intervals, or other causes. Here, the area additionally needed for the testing can be secured without unduly increasing the area of the liquid crystal display device.

When the liquid crystal display device is tested, the short-circuiting bar may be connected to the data signal lines at the portions thereof nearer to the display area than the diodes. This eliminates the need to put probes in contact with all the data signal terminals to apply testing voltages thereto, and thereby helps realize a liquid crystal display device that permits testing for uneven display of halftone between white and black and other defects by the use of a short-circuiting bar, which promises easy and secure contact.

Moreover, it is possible to realize a liquid crystal display device that permits easy testing for uneven display of colors by permitting one of the red, green, and blue colors to be displayed at one time according to the presence/absence and the polarity of the diodes even when the short-circuiting bar is put in contact with all of the first, second, and third lines.

According to another aspect of the present invention, a method for testing a liquid crystal display device provided with data signal lines consisting of recurrently formed first, second, and third lines that have open ends and are used for data entry, first diodes formed on the first lines, and second diodes formed on the second lines and having the opposite polarity to the first diodes includes a step of putting a short-circuiting bar for supplying testing voltages in contact with the data signal lines at the portions thereof nearer to the ends thereof than the first and second diodes and a step of applying different direct-current voltages sequentially to the short-circuiting bar.

By this method, it is possible to display colors in different ways according to the presence/absence and the polarity of the diodes simply by applying a single DC voltage by the use of a short-circuiting bar, which promises easy and secure contact, and thereby conduct a test for uneven display. Thus, when the liquid crystal display device is tested for uneven display of colors, there is no need to put probes in contact with all the data signal terminals to apply predetermined testing voltages thereto. This helps reduce the risk of erroneous testing and thereby greatly reduce the testing cost.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1A:
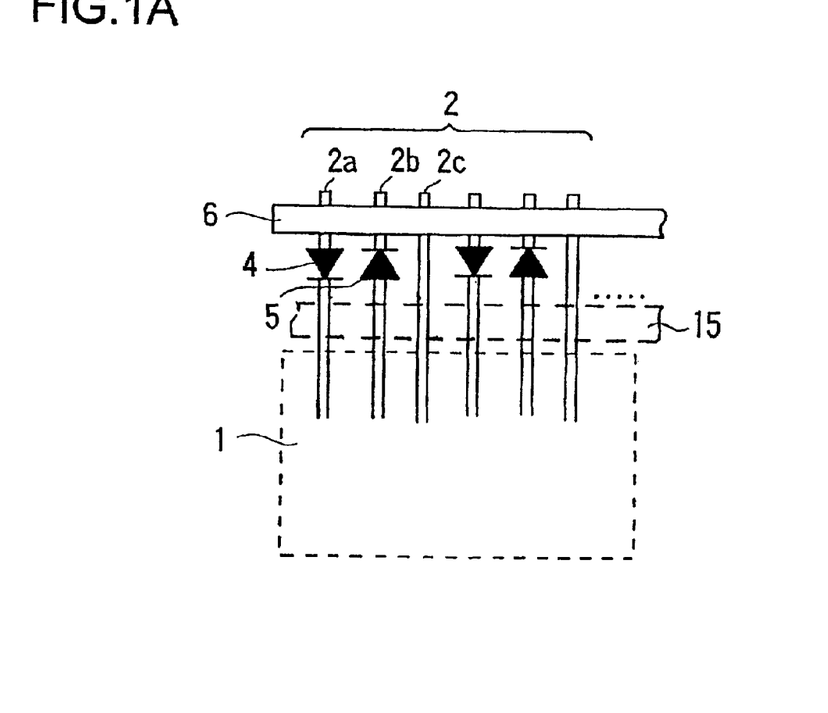
FIGS. 1A and 1B are circuit diagrams showing a first embodiment of the invention.
Figure 1B:
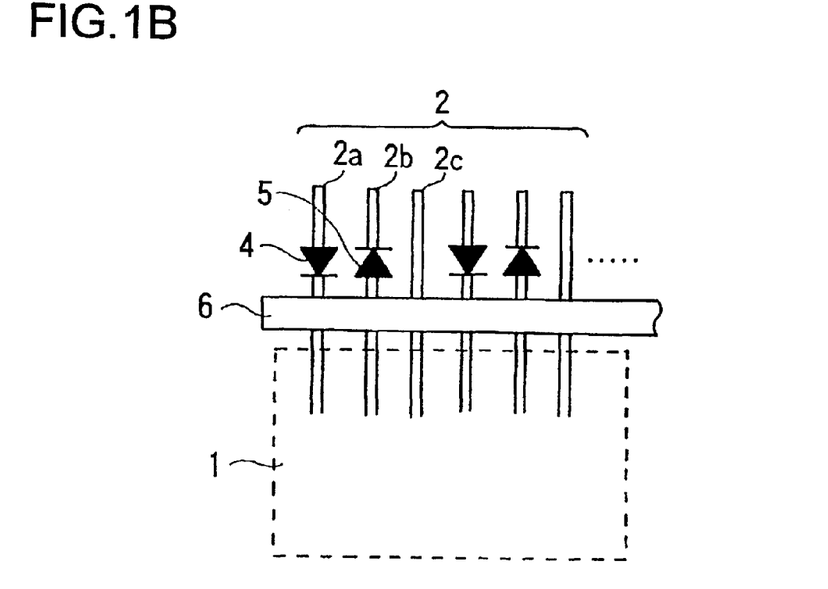

Hereinafter, embodiments of the present invention will be described with reference to the drawings. FIGS. 1A and 1B are circuit diagrams of a first embodiment of the invention, showing data signal lines of a liquid crystal display device and a testing method using them. In FIGS. 1A and 1B, elements other than a display area 1 together constitute an input terminal portion. To the individual R, G, and B pixels provided inside the display area 1, drive signals are fed by way of a tab 15 and data signal lines 2. The data signal lines 2 consist of R-color data signal lines 2a, G-color data signal lines 2b, and B-color data signal lines 2c that are arranged recurrently. On the R-color data signal lines 2a, forward-connected diodes 4 are formed and, on the G-color data signal lines 2b, reverse-connected diodes 5 are formed; on the B-color data signal lines 2c, no diodes are formed. This is repeated for all the data signal lines. The data signal lines 2 have their end portions, i.e. the portions beyond the forward- and reverse-connected diodes 4 and 5, left open.

It is to be noted that, in the present specification, diodes that are formed in such an orientation as those formed on the R-color data signal lines 2a are referred to as forward-connected diodes and diodes that are formed in the opposite orientation, like those formed on the G-color data signal lines 2b, are referred to as reverse-connected diodes.

The signal lines and elements provided inside the display area 1 are usually formed by photolithography. On the other hand, in liquid crystal display devices having active elements such as TFTs, the diodes 4 and 5 can easily be formed by forming N-type and P-type layers contiguously in the same process in which those elements are formed.

Figure 2:
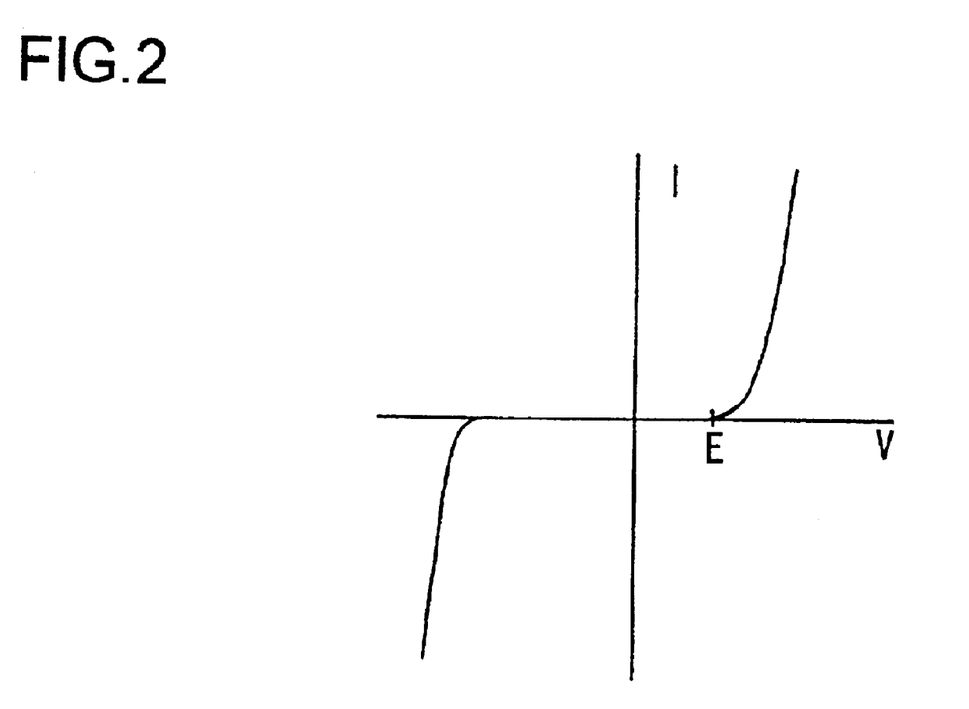
FIG. 2 is a diagram showing the characteristics of the diodes provided on the data signal lines.

FIG. 2 is a diagram showing the characteristics of the diodes 4 and 5 formed on the R-color and G-color data signal lines 2a and 2b, respectively. As shown in FIG. 2, the diodes 4 and 5 start permitting a current to flow therethrough at the voltage E.

In FIG. 1A, the tab 15 is not laid until testing is complete. Suppose that now a test for uneven display is conducted. On the end portions of the data signal lines 2 beyond the diodes 4 and 5 (where they are left open), a conductive short-circuiting bar 6 is put in such a way as to make contact with all the data signal lines. The data signal lines 2 are so formed as to be sufficiently long to permit the short-circuiting bar 6 to be put on the end portions thereof, and have those end portions left open. In a test for uneven display of colors, the test is conducted by applying three different DC voltages sequentially to the short-circuiting bar 6.

Figure 3A:
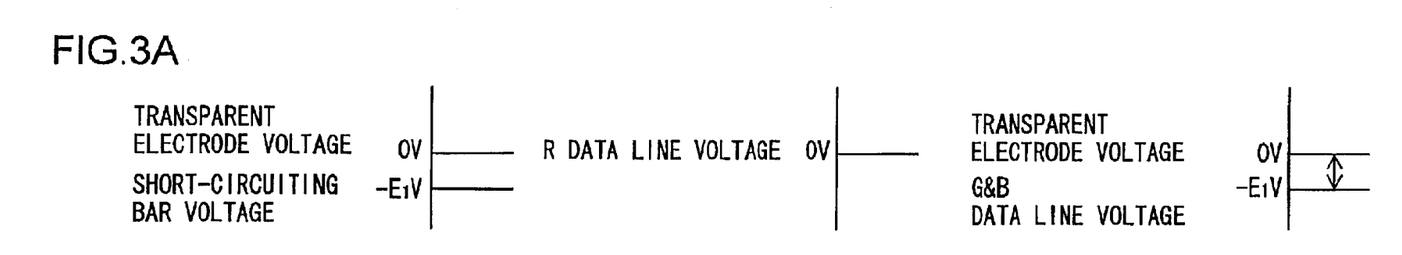
FIGS. 3A, 3B, and 3C are diagrams showing the voltages on the short-circuiting bars, the transparent electrodes, and the data signal lines.
Figure 3B:
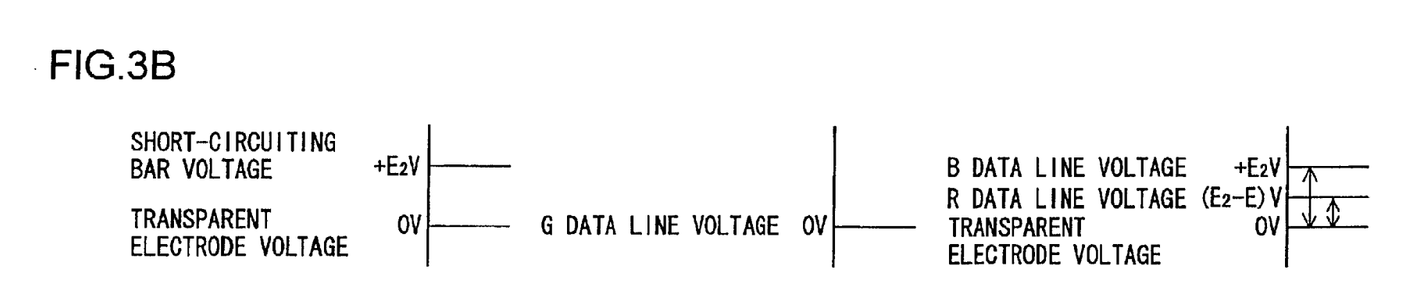
Figure 3C:
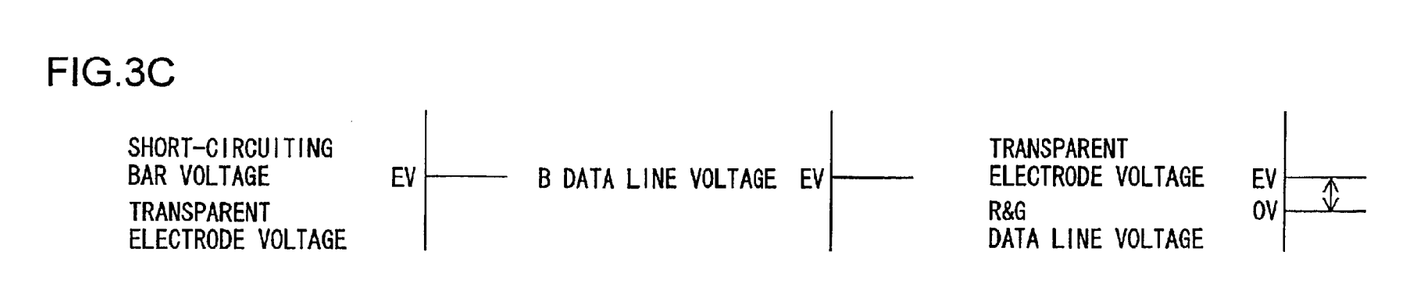

FIGS. 3A, 3B, and 3C are diagrams showing the voltages on the short-circuiting bar, the transparent electrodes, and the three types of data signal lines when the R, G, and B colors, respectively, are displayed. Here, the liquid crystal display area 1 shown in FIGS. 1A and 1B is assumed to be of a normally white type as shown in FIG. 7. That is, light is transmitted when there is no voltage difference between the data signal lines connected to the pixels electrodes and the transparent electrodes.

When the R color is displayed to test the R-color filters for uneven display, as shown in FIG. 3A, to the short-circuiting bar 6, a voltage of $-E_1$ V is applied. This voltage, through the forward-connected diodes 4, turns the voltage on the R-color data signal lines, i.e. the voltage that is actually fed to the liquid crystal display area 1 by way of those data signal lines, to 0 V. The same voltage, through the reverse-connected diodes 5, turns the voltage on the G-color data signal lines to $-E_1$ V, and appears intact as $-E_1$ V on the B-color data signal lines, which have no diodes formed thereon. In this state, applying a voltage of 0 V to the transparent electrodes, which face the data signal lines, causes the voltage difference between the transparent electrodes and the R-color data lines, which have already been turned to 0V, to become 0V, and thus only the R color is displayed. In this way, simply by applying a single voltage $-E_1$ V to the short-circuiting bar 6 and adjusting the voltage on the transparent electrodes, it is possible to apply to the data signal lines of the individual colors the voltages necessary to display the R color.

Similarly, when the G color is displayed to test the G color filters for uneven display, as shown in FIG. 3B, to the short-circuiting bar 6, a voltage of $+E_2$ V is applied. This voltage, through the reverse-connected diodes 5, turns the voltage on the G-color data signal lines to 0 V. The same voltage, through the forward-connected diodes 4, turns the voltage on the R-color data signal lines to $(E_2 -E)$ V, and appears intact as $+E_2$ V on the B-color data signal lines, which have no diodes formed thereon. In this state, applying a voltage of 0 V to the transparent electrodes, which face the data signal lines, causes the voltage difference between the transparent electrodes and the G-color data lines to become 0V, and thus only the G color is displayed.

Similarly, when the B color is displayed to test the B color filters for uneven display, as shown in FIG. 3C, to the short-circuiting bar 6, a voltage of $+E$ V is applied. This voltage, through the forward-connected diodes 4, turns the voltage on the R-color data signal lines to 0 V. The same voltage, through the reverse-connected diodes 5, turns the voltage on the G-color data signal lines also to 0 V, and appears intact as $+E$ V on the B-color data signal lines, which have no diodes formed thereon. In this state, applying a voltage of $+E$ V to the transparent electrodes, which face the data signal lines, causes the voltage difference between the transparent electrodes and the B-color data lines to become 0V, and thus only the B color is displayed.

Figure 4:
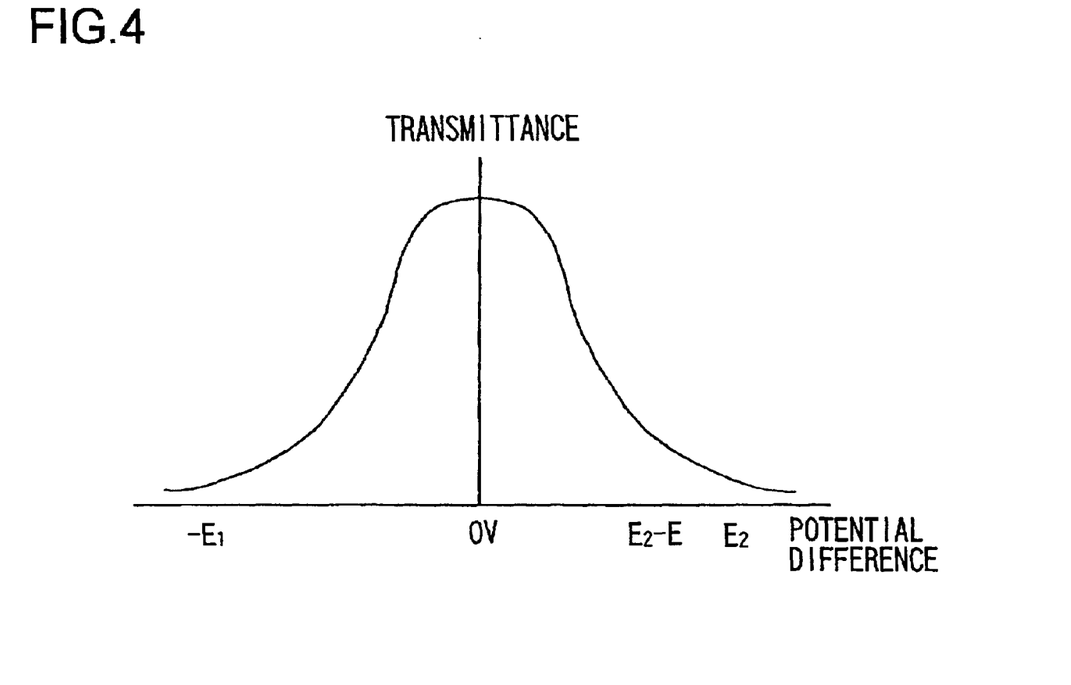
FIG. 4 is a diagram showing the transmittance of the liquid crystal with respect to the potential difference between the transparent electrodes and the data signal lines.

FIG. 4 is a diagram showing the transmittance of the liquid crystal with respect to the potential difference between the transparent electrodes and the data signal lines in a liquid crystal display device of a normally white type. The test described above is conducted with consideration given to this relationship. Thus, for example, when $E=+3.5$ to $+5$ V, $E_1=-3.5$ to $-10$ V, and $E_2=+7$ to $+10$ V, then $E_2-E=+3.5$ to $+5$ V. The low transmittance under these conditions makes it possible to test the display of the individual colors simply by applying a single voltage to the short-circuiting bar 6 as shown in FIG. 1A.

Figure 5:
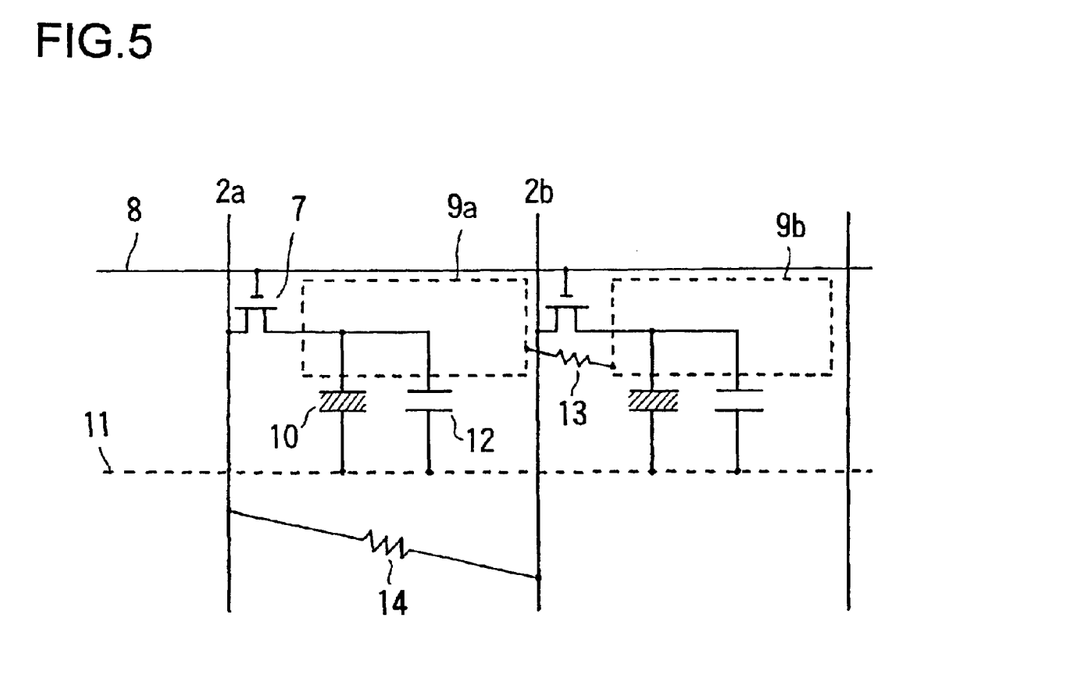
FIG. 5 is a circuit diagram showing short circuits between the pixel electrodes and between the data signal lines.

FIG. 5 is a circuit diagram showing short circuits that can be detected through testing as described above. The TFT 7 has its source connected to the data signal line 2a, and has its gate connected to the scanning signal line 8. The drain of this TFT 7 is connected to the pixel electrode 9a, and the liquid crystal 10 is sealed in between this pixel electrode 9a and the transparent electrode 11 formed on the glass substrate facing the pixel electrode 9a. In parallel with the liquid crystal 10, a capacitor 12 is formed.

For example, when the display of the R color is tested, display should be effected only on the pixel electrode 9a that is connected to the R-color data signal line 2a. If display is effected on the pixel electrode 9b also, it is found that there is a short circuit (represented by a resistor 13) between the pixel electrodes 9a and 9b and that there is a defective dot. On the other hand, if display is effected on all the pixels that are connected to the data signal line 2b, it is found that there is a short circuit (represented by a resistor 14) between the data signal lines 2a and 2b and that there is a defective line.

Furthermore, if no display is effected on the pixels on which display should be effected, it is found that the TFTs that are connected to those pixels are defective.

FIG. 1B shows how the display of halftone between white and black is tested. Specifically, the conductive short-circuiting bar 6 is put on the portions of the data signal lines 2 farther from the ends thereof than the diodes 4 and 5 formed thereon (i.e. nearer to the display area 1) in such a way as to make contact with all the data signal lines. The data signal lines 2 are so formed as to be sufficiently long to permit the short-circuiting bar 6 to be put on inner portions thereof. By feeding a test signal to the data signal lines 2 by way of the short-circuiting bar 6, it is possible to detect uneven display of halftone between white and color and other defects.

When the testing described above is complete, the tab 15 is bonded in the position shown in FIG. 1A so that the data signal lines provided on the tab 15 are connected to the aforementioned data signal lines 2. In actual use, data signals are fed from a driver IC (not shown) by way of the tab 15 to the portions of the data signal lines 2 nearer to the display area 1 than the diodes 4 and 5, and therefore there is no need to cut off the diodes 4 and 5, although they are for testing only.

Figure 6A:
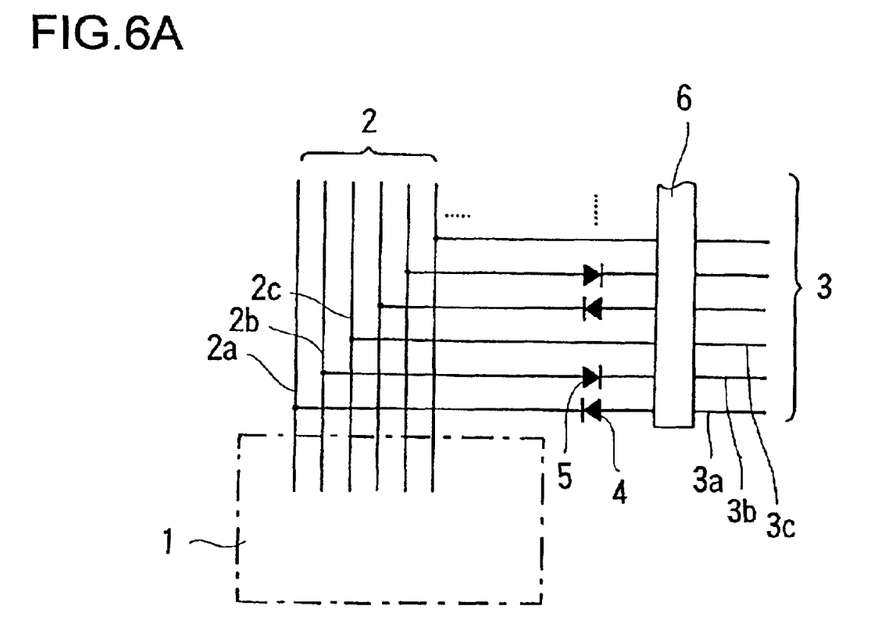
FIGS. 6A and 6B are circuit diagrams showing a second embodiment of the invention.
Figure 6B:
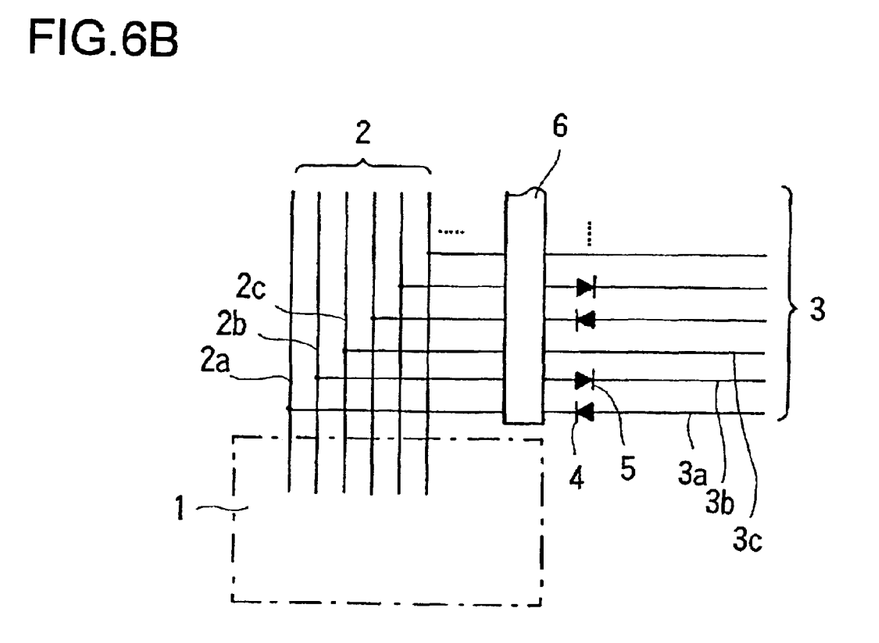

FIGS. 6A and 6B are circuit diagrams showing a second embodiment of the invention. To the individual R, G, and B pixels provided inside a display area 1, drive signals are fed by way of data signal lines 2. From the data signal lines 2, test signal lines 3 branch off. The data signal lines 2 consist of R-color data signal lines 2a, G-color data signal lines 2b, and B-color data signal lines 2c that are arranged recurrently. Similarly, the test signal lines 3, which branch off from the data signal lines 2, consist of R-, G-, and B-color test signal lines that are arranged recurrently. On the R-color test signal lines 3a, forward-connected diodes 4 are formed and, on the G-color test signal lines 3b, reverse-connected diodes 5 are formed; on the B-color test signal lines 3c, no diodes are formed. This is repeated for all the test signal lines. The test signal lines 3 have their end portions, i.e. the portions beyond the forward- and reverse-connected diodes 4 and 5, left open.

The signal lines and elements provided inside the display area 1 are usually formed by photolithography, and the branching of the data signal lines 2 can be formed by a similar process. On the other hand, as described previously, in liquid crystal display devices having active elements such as TFTs, the diodes 4 and 5 can easily be formed by forming N-type and P-type layers contiguously in the same process in which those elements are formed.

In the second embodiment shown in FIGS. 6A and 6B, the same testing method is used as in the first embodiment shown in FIGS. 1A and 1B. Specifically, various tests are conducted by putting a short-circuiting bar 6 on the upstream or downstream side of the diodes 4 and 5 and then applying a single DC voltage to the short-circuiting bar 6. The diodes 4 formed on the R-color test signal lines 3a in FIGS. 6A and 6B have the same characteristics as the diodes 4 formed on the R-color data signal lines 2a in FIGS. 1A and 1B, and the diodes 5 formed on the G-color test signal lines 3b in FIGS. 6A and 6B have the same characteristics as the diodes 5 formed on the G-color data signal lines 2b in FIGS. 1A and 1B.

In actual use, data signals are fed from the data signal lines 2 shown in FIGS. 6A and 6B directly to the display area 1 without passing through the diodes 4 and 5, and therefore there is no need to cut off the diodes 4 and 5, although they are for testing only.

What is claimed is:

1. A liquid crystal display device comprising:

a first insulating substrate;

a plurality of mutually parallel scanning signal lines and a plurality of mutually parallel data signal lines, said plurality of scanning signal lines and said plurality of data signal lines being disposed perpendicularly relative to one another on a surface of said first insulating substrate so as to form a matrix-like array of intersections at each of which one of said plurality of scanning signal lines and one of said plurality of data signal lines cross;

a plurality of pixel electrodes, one of said plurality of pixel electrodes being located at each said intersection and each said pixel electrode being electrically connected to the scanning signal line and the data signal line forming said intersection by a transistor having its gate electrically connected to the scanning signal line, its source electrically connected to the data signal line and its drain electrically connected to the pixel electrode;

a second transparent insulating substrate disposed in spaced opposing relation to said first insulating substrate;

a transparent counter electrode, said transparent counter electrode being located on the surface of said second transparent insulating substrate facing said first insulating substrate opposite said plurality of pixel electrodes; and a display medium layer sandwiched between said first and second insulating substrates, said display medium layer being light transmitting or not light transmitting in the volumes located between each said pixel electrode and said counter electrode according to the electrical potential difference applied across the display medium layer in each said volume;

further characterized in that:

said plurality of data signal lines consists of recurrently formed groupings of first, second, and third types of data signal lines, each said data signal line type having an open end, said first type of data signal line comprising electrical wiring used for data signal entry and defining a first diode of a first polarity located in spaced relation to its open end;

said second type of data signal line comprising electrical wiring used for data entry and defining a second diode having a second polarity opposite to said first polarity located in spaced relation to its open end; and said third type of data signal line comprising only electrical wiring used for data entry;

said data signal lines are so formed as to permit a short-circuiting bar for supplying testing voltages to be put in contact with the data signal lines at portions thereof spaced from the open ends thereof by a distance smaller than the smaller of the distances that said first and second diodes are spaced from the open ends of the first and second type data signal lines respectively; and a variable voltage supply is connected to said transparent counter electrode for selectively supplying preselected voltages to said counter electrode according to said testing voltages applied to the data signal lines while scanning signals are being sequentially applied to said scanning signal lines such that said display medium layer is light transmitting only in the volume between the ones of said pixel electrodes associated with one type of said data signal lines and said counter electrode when a selected one of said testing voltages is applied to said display lines by said short-circuiting bar in the absence of a short circuit between said pixel electrodes.

2. A liquid crystal display device as claimed in claim 1, wherein the first, second, and third data signal lines types are data signal lines types associated with pixels that display red, green, and blue colors, respectively.

3. A method for testing a liquid crystal display device comprising:

a first insulating substrate;

a plurality of mutually parallel scanning signal lines and a plurality of mutually parallel data signal lines, said plurality of scanning signal lines and said plurality of data signal lines being disposed perpendicularly relative to one another on a surface of said first insulating substrate so as to form a matrix-like array of intersections at each of which one of said plurality of scanning signal lines and one of said plurality of data signal lines cross;

a plurality of pixel electrodes, one of said plurality of pixel electrodes being located at each said intersection and each said pixel electrode being electrically connected to the scanning signal line and the data signal line forming said intersection by a transistor having its gate electrically connected to the scanning signal line, its source electrically connected to the data signal line and its drain electrically connected to the pixel electrode;

a second transparent insulating substrate disposed in spaced opposing relation to said first insulating substrate;

a transparent counter electrode, said transparent counter electrode being located on the surface of said second transparent insulating substrate facing said first insulating substrate opposite said plurality of pixel electrodes; and a display medium layer sandwiched between said first and second insulating substrates, said display medium layer being light transmitting or not light transmitting in the volumes located between each said pixel electrode and said counter electrode according to the electrical potential difference applied across the display medium layer in each said volume;

further characterized in that:

said plurality of data signal lines consists of recurrently formed groupings of first, second, and third types of data signal lines, each said data signal line type having an open end, said first type of data signal line comprising electrical wiring used for data signal entry and defining a first diode of a first polarity located in spaced relation to its open end;

said second type of data signal line comprising electrical wiring used for data entry and defining a second diode having a second polarity opposite to said first polarity located in spaced relation to its open end; and said third type of data signal line comprising only electrical wiring used for data entry; and a variable voltage supply is connected to said transparent counter electrode;

wherein the method comprises the steps of:

putting a short-circuiting bar for supplying testing voltages in contact with the data signal lines at portions thereof spaced from the open ends thereof by a distance smaller than the smaller of the distances that said first and second diodes are spaced from the open ends of the first and second type data signal lines respectively; and selectively supplying preselected voltages to said counter electrode according to said testing voltages applied to the data signal lines while scanning signals are being sequentially applied to said scanning signal lines such that said display medium layer is light transmitting only in the volume between the ones of said pixel electrodes associated with one type of said data signal lines and said counter electrode when a selected one of said testing voltages is applied to said display lines by said short-circuiting bar in the absence of a short circuit between said pixel electrodes.

4. A method for testing a liquid crystal display device as claimed in claim 3, wherein the first, second, and third data signal lines types are data signal lines types associated with pixels that display red, green, and blue colors, respectively.

* * * * *